No. 667,789. Patented Feb. 12, 1901.
J. N. McGUIRE.
AUTOMATIC STOCK WATERING FOUNTAIN.
(Application filed June 18, 1900.)
(No Model.)
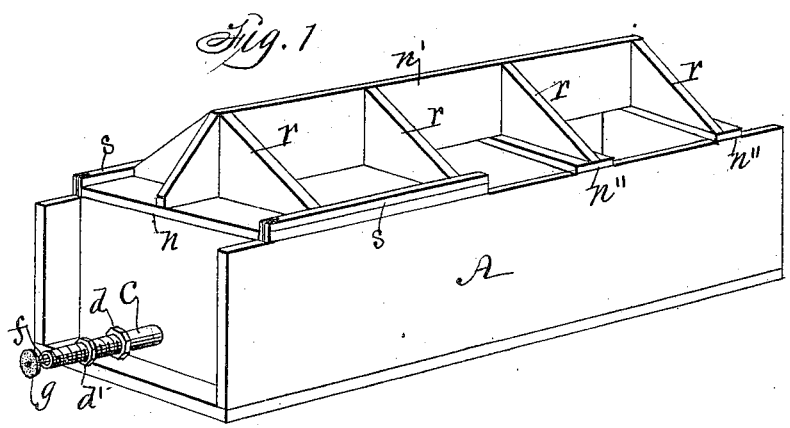
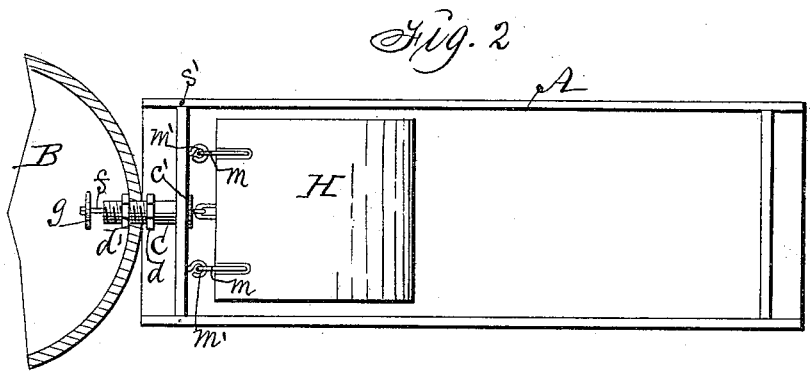
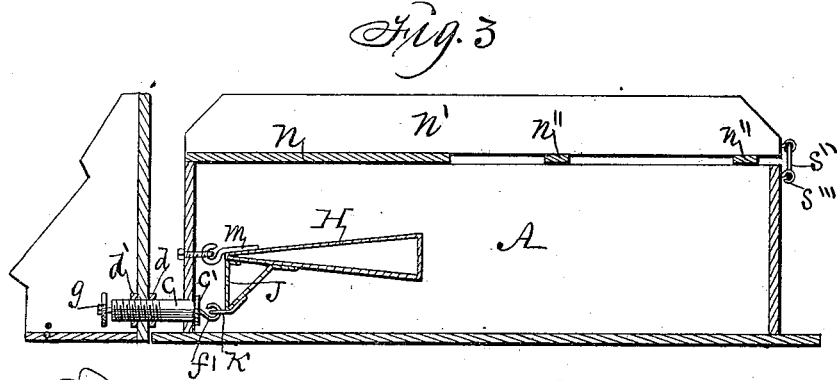
Witnesses:
F. C. Stuart
R. C. Orwig
Inventor:
Joseph N. McGuire
By Thomas G. Orwig, Attorney.

UNITED STATES PATENT OFFICE.

JOSEPH N. McGUIRE, OF MURRAY, IOWA.

AUTOMATIC STOCK-WATERING FOUNTAIN.

SPECIFICATION forming part of Letters Patent No. 667,789, dated February 12, 1901.

Application filed June 18, 1900. Serial No. 20,655. (No model.)

*To all whom it may concern:*

Be it known that I, JOSEPH N. MCGUIRE, a citizen of the United States, residing at Murray, in the county of Clarke and State of Iowa, have invented a new and useful Automatic Fountain for Watering Animals, of which the following is a specification.

My object is to provide improved mechanism adapted to be advantageously connected with a trough and a barrel or tank to be automatically operated as a fountain where large and small animals can obtain clean water to drink without wasting any or wetting the ground to produce mud around the trough.

My invention consists in the construction, arrangement, and combination of parts as hereinafter set forth, pointed out in my claims, and illustrated in the accompanying drawings, in which—

Figure 1 is a perspective view of the trough adapted to be connected with a barrel or tank and provided with a removable top that covers, conceals, and protects operative mechanism and divides the open space of the top of the trough into four distinct parts through which animals can gain access to water at the same time without interfering with each other. Fig. 2 is a top view showing the cover removed and the manner of connecting the trough with a barrel. Fig. 3 is a longitudinal sectional view of the trough and cover and part of a tank, showing the float in its lowered normal position and the valve open, as required, to allow water to flow from the tank into the trough.

The letter A designates a wooden trough of oblong form that may vary in dimensions as desired.

B represents a barrel or tank adapted to retain a supply of water. Coinciding openings in the trough and tank admit an open-ended metal tube $c$, that has a flange $c'$ at one end to engage the inside face of the end of the trough, as required, to produce a water-tight joint and is screw-threaded on the exterior of its other end portion that enters the tank. By means of nuts $d$ and $d'$ the tube is securely clamped fast to the tank in such a manner as to prevent water from leaking out around the tube. A valve-stem $f$ is extended through the tube and has a hook $f'$ on its end that extends into the trough and a valve $g$ on on its other end that extends into the tank.

H is a sheet-metal float of tapering form that has a triangular-shaped fixed metal frame J at its small end and under side and an eye $k'$ projecting horizontally from its lower end to admit the hook $f'$ of the valve-stem. On the top and small end of the float are fixed hooks $m$, adapted to be detachably connected with fixed screw-eyes $m'$, projecting inward from the inside face of the end of the trough. By thus forming and detachably connecting the float with the trough and the valve-stem it will perform the function of a bell-crank lever, so that when the float is down in its normal position the valve will be in an open position to allow water to flow from the tank and through the tube into the trough, and as the water rises in the trough and the float is raised thereby it will by means of the valve-stem in the tube draw the valve against the end of the tube to close it and stop the flow of water, and when the water in the trough is lowered by hogs or cattle drinking therefrom the float will descend by force of gravity and in so doing open the tube again to allow the passage of water therethrough from the tank into the trough. A simple, strong, durable, and automatic mechanism is thus provided for regulating the flow of water from the tank into the trough as required by animals that have access to the trough.

A removable cover for the end portion of the trough in which the float is located is composed of a piece of board $n$, to the center of which is fixed in vertical position a strip of board $n'$ to extend from end to end of the trough. To the lower edge of the strip $n'$ are fixed cross-pieces $n''$, that rest upon the parallel straight and level edges of the trough, and on top of said cross-pieces are fixed triangular-shaped pieces $r$ to brace the strip $n'$ and to keep animals separate and from interfering with each other as they drink from the trough. Strips of wood $s$, fixed to the edges of the board $n$, are slotted at their outer ends to admit pins $s'$, fixed in the top edge of the trough, and a hook $s''$ at the other end of the cover, adapted to enter an eye $s'''$, fixed to the end of the trough, to serve as means for detachably fastening the cover to the trough.

Having thus described my invention, what I claim as new, and desire to secure by Letters Patent therefor, is—

1. An automatic fountain for watering stock comprising a supply-tank, a trough, an open-ended tube fixed in the tank and trough, a stem having a valve at one end and a hook at its other end extended through the tube, a sheet-metal float tapering from one end to the other and having a triangular-shaped frame fixed to its small end and lower side and provided with an eye adapted to engage the hook on the end of the stem in the tube, hooks on the top of the float and screw-eyes fixed in the end of the trough to engage said hooks and a removable cover, as shown and described to operate in the manner set forth for the purposes stated.

2. The float H having a triangular-shaped frame at its small end and under side, an eye $k$ at the lower corner of the frame and hooks $m$ on its top in combination with a trough having fixed eyes $m'$, an open-ended tube $c$ fixed in the end of the trough, a valve-stem $f$ extended through the tube and provided with a hook $f'$ at one end and a valve $g$ at its other end, all arranged and combined to operate in the manner set forth for the purposes stated.

JOSEPH N. McGUIRE.

Witnesses:
 PHIL ALLEN,
 A. B. MILLER.